(12) United States Patent
Sanchez et al.

(10) Patent No.: US 9,826,333 B2
(45) Date of Patent: Nov. 21, 2017

(54) DEALER CELLULAR PHONE ACTIVATION PORTAL WITH REAL-TIME COMMISSION MANAGEMENT

(71) Applicants: Jeyson Sanchez, Anaheim, CA (US); John H. Sanchez, Cerritos, CA (US)

(72) Inventors: Jeyson Sanchez, Anaheim, CA (US); John H. Sanchez, Cerritos, CA (US)

(73) Assignee: Simapay Inc., Anaheim, CA (US)

( * ) Notice: Subject to any disclaimer, the term of this patent is extended or adjusted under 35 U.S.C. 154(b) by 0 days.

(21) Appl. No.: 14/941,241

(22) Filed: Nov. 13, 2015

(65) Prior Publication Data

US 2017/0142537 A1    May 18, 2017

(51) Int. Cl.
| | |
|---|---|
| *H04M 3/00* | (2006.01) |
| *H04W 4/00* | (2009.01) |
| *H04L 29/08* | (2006.01) |
| *G06Q 50/32* | (2012.01) |

(52) U.S. Cl.
CPC ............ *H04W 4/001* (2013.01); *G06Q 50/32* (2013.01); *H04L 67/02* (2013.01)

(58) Field of Classification Search
CPC ............... G06F 21/35; G06F 17/30424; G06F 17/30861; G06F 17/30864; G06F 11/3476; G06F 17/30; G06F 17/30463; G06F 17/30522; G06F 17/30575; G06Q 50/32
See application file for complete search history.

(56) References Cited

U.S. PATENT DOCUMENTS

| | | | |
|---|---|---|---|
| 2010/0184408 A1* | 7/2010 | Vendrow ........... | H04M 3/42153 455/411 |
| 2010/0188975 A1* | 7/2010 | Raleigh ............ | G06Q 10/06375 370/230.1 |
| 2011/0159843 A1* | 6/2011 | Heath ................... | H04W 8/18 455/411 |
| 2011/0231272 A1* | 9/2011 | Englund ................ | G06Q 20/20 705/21 |
| 2015/0381535 A1* | 12/2015 | Selinger ............... | G06Q 30/018 709/206 |

* cited by examiner

*Primary Examiner* — Khalid Shaheed
(74) *Attorney, Agent, or Firm* — Andrew Dallmann, P.C.

(57) ABSTRACT

The present invention provides an integrated web-based portal for dealers to activate and port cellular devices/SIM cards and manage associated commissions in real time. The web-based portal provides for immediate payment of commissions earned by a dealer. Additionally, the portal includes user interface modules for displaying SIM inventory, dealer account information, activation history and payment history.

13 Claims, 22 Drawing Sheets

Figure 17

DEALER CELLULAR PHONE ACTIVATION PORTAL WITH REAL-TIME COMMISSION MANAGEMENT

RELATED U.S. APPLICATION DATA

This application claims priority to Provisional Application No. 62/080,234, filed Nov. 14, 2014.

FIELD OF THE INVENTION

The disclosure relates to web-based portals for management and activation of wireless communication services.

BACKGROUND OF THE INVENTION

In today's cellular phone industry, there are a variety of cellular phone makers and service providers, as well as many thousands of dealers who sell cell phones and service plans. Conventionally, when dealers activate or port a cell phone for a customer they receive a commission from the applicable service provider. It would be desirable in the art to have a web-based portal that permits dealers to selectively activate cell phones and subscriber identity module (SIM) cards, to calculate commissions earned for activations on a real-time basis, to obtain immediate payment of commissions earned, and to manage and report on the inventory of cell phones and SIMS.

SUMMARY OF THE INVENTION

One aspect of the invention provides an integrated web-based portal for activating and porting cell phones and SIM cards. Yet another aspect of the invention provides for real-time reporting of commissions earned for activation and porting of cell phones and SIM cards. Yet another aspect of the invention provides for immediate payment of commissions earned by a dealer. Additionally, the web-based portal includes user interface modules for displaying SIM inventory, dealer account information, activation history and payment history.

BRIEF DESCRIPTION OF THE DRAWINGS

FIG. 17 illustrates an exemplary user interface of the cellphone activation portal with dealer payment account options.

DETAILED DESCRIPTION

The present invention provides a methodology for unifying all essential aspects of commission-based dealership of cellular phones into a web-based portal that is accessible by a dealer. In the following discussion, numerous specific details are set forth to provide a thorough understanding of the present invention. However, those skilled in the art will appreciate that the present invention may be practiced without such specific details. In other instances, well-known elements, processes or techniques have been briefly mentioned and not elaborated on in order not to obscure the present invention in unnecessary detail and description. Moreover, specific details and the like may have been omitted inasmuch as such details are not deemed necessary to obtain a complete understanding of the invention, and are considered to be within the understanding of persons having ordinary skill in the relevant art.

Figure 1:
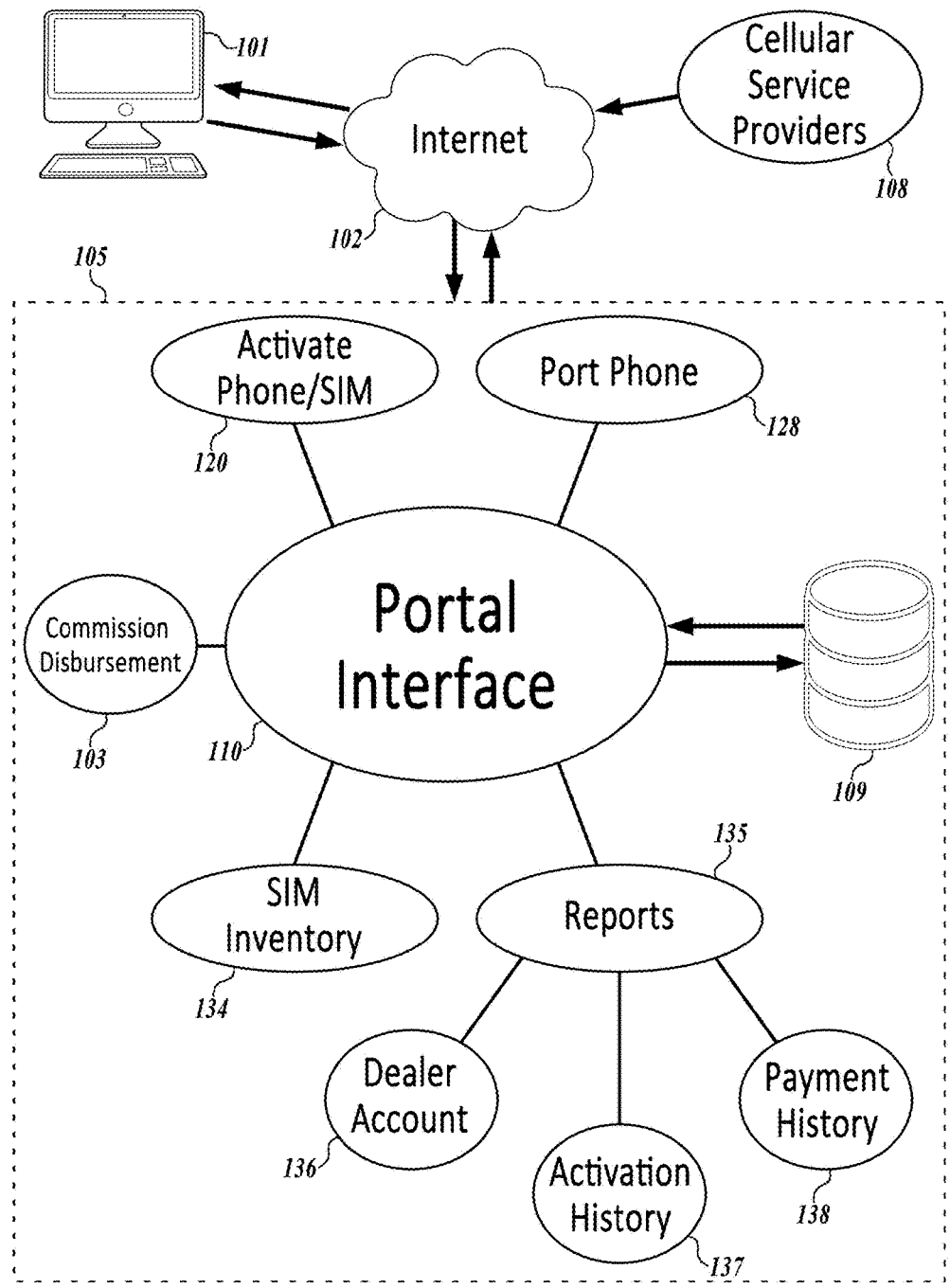
FIG. 1 illustrates a high-level diagram showing the data exchange whereby the cellphone activation portal provides dealer resources.

FIG. 1 illustrates a high-level diagram showing the data exchange whereby the cellphone activation portal provides dealer resources. The present invention offers a database-portal system operating within standard client-server architecture. The web-based system may be comprised of a front-end component and a back-end component, which may require a network for its operation and communication between the front-end and back-end components.

A dealer cellphone activation portal 105 (shown with dotted lines) comprises a database 109 (or plurality of databases), and a portal interface 110 with numerous dealer resources. These resources encompass a variety of options for managing both customer and dealer activities, and are not limited to cellphone activation. A user/dealer may access the portal interface 110 via an Internet connection 102 using a remote user device 101 (i.e. personal computer). As well, data from all associated cellular service providers 108 is delivered into and stored by the databases 109 via an Internet connection 102. This data includes plan parameters and other carrier information relevant to a dealer's implementation of customer services and earned commissions. A portal interface 110 automatically communicates with the database 109 to provide current data (e.g. cellular service plans, dealer commissions) that are utilized by the system and displayed in various user interfaces. After creating an account with the portal interface 110, a user (i.e. dealer) can manage their primary customer services, including the activation of cell phones and subscriber identity module (SIM) cards 120, and the porting of phone numbers 128. The dealer can keep track of SIMs via a SIM inventory 134. Additionally, the dealer has access to reports 135, which provide real-time monitoring of a dealer account 136, activation history 137, payment history 138, and other portal activities/resources. This aspect of the invention provides for the calculation and immediate payment of commissions earned by the dealer. Using the portal interface 110, a dealer is afforded a number of options for commission disbursement 103, including the use of designated bank/payment accounts for managing funds and disbursement.

Figure 2:
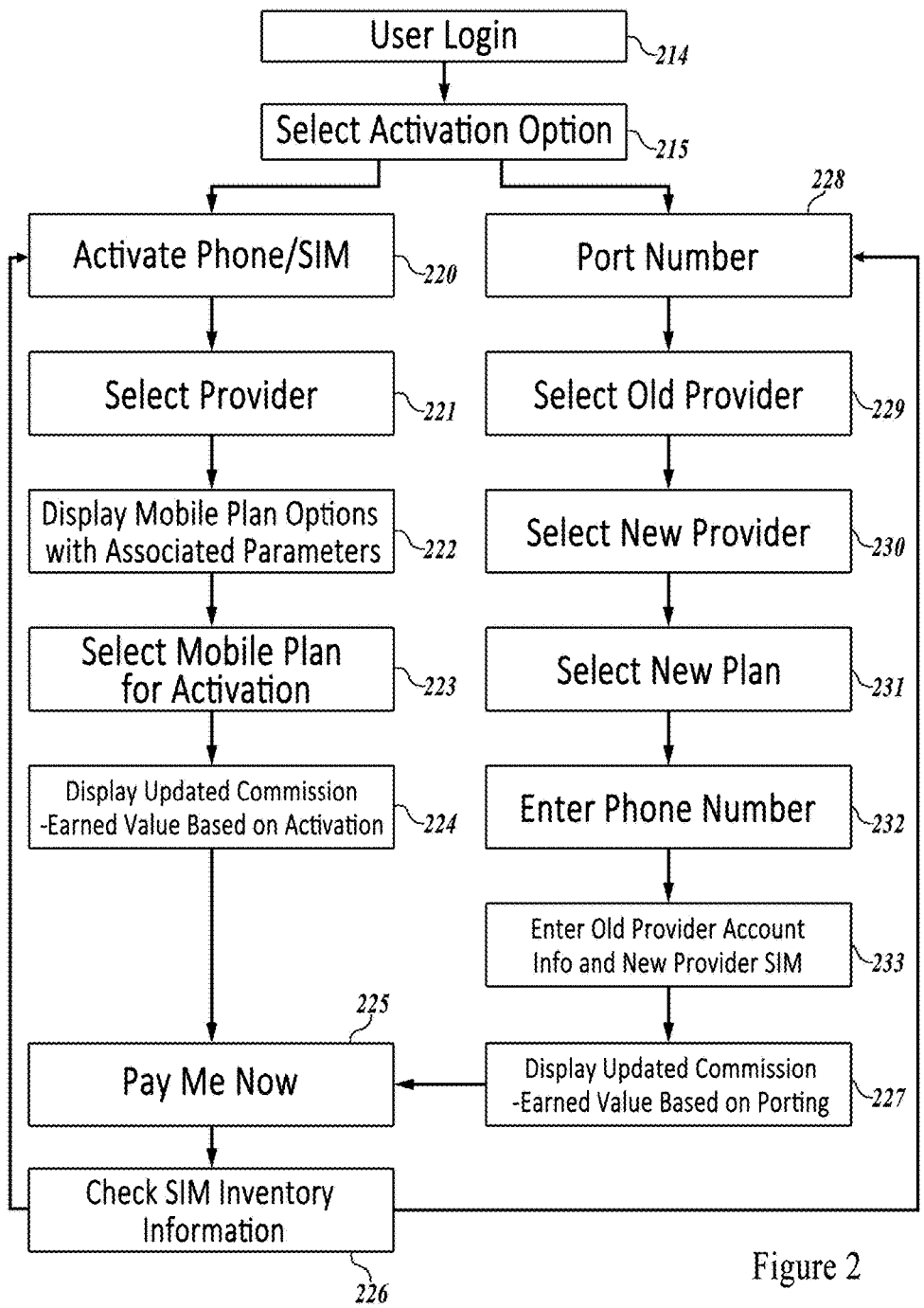
FIG. 2 illustrates a flowchart outlining the processes of phone/SIM card activation and number porting via the cellphone activation portal.

FIG. 2 illustrates a flowchart outlining the step-by-step methods of phone/SIM card activation and number porting via the cellphone activation portal. As stated by portal login step 214, the user/dealer initially must input login information to gain access to the portal. Portal option 215 states that the user/dealer must choose an activation option—either to selectively activate a customer's phone/SIM card or port a customer's number from their current cellular service provider. Activation steps 220 and 228 show these options, respectively. By choosing to activate a phone/SIM card, the user is then presented with a list of available providers with which to commence service. As stated by activation step 221, the user must select a provider in order to proceed. As shown by activation step 222, once a provider is selected, the portal displays that provider's mobile plan options, each plan having a set of associated parameters. The user must select a mobile plan for activation, as stated by activation step 223. As shown by activation step 224, a commission-earned value is updated in real-time to reflect the result of all completed activations, and is highly visible while navigating any area of the portal. As well, the user can navigate to a dedicated reporting/accounting area of the portal for a more detailed account of the activations/commissions. Payment step 225 indicates the "pay me now" option available to the dealer, which allows immediate payment of the commission-earned value based on activations. The "pay me now" option can be a button that is highly visible while navigating any area of the portal.

If at the initial portal option 215, the user elects to take the porting step 228, they can proceed with a method of porting a customer's phone number from their current carrier to a new carrier. Porting step 229 requires the user to select the customer's old provider. Porting step 230 requires the user to select a new provider. Porting step 231 requires the user to select a new plan with unique set of provider parameters for the customer. Porting step 232 requires the entering of the customer's phone number into a data input field. Porting step 233 requires the user to enter the account information associated with the customer's previous provider, and SIM card properties associated with the customer's new provider. As shown by porting step 227, upon completing the porting process, the user can view the abovementioned commission-earned value, which is updated in real-time to reflect the result of all completed porting operations. As in the case of activation, the user can then opt to receive payment—via payment step 225. Inventory management step 226 indicates user navigation to a SIM inventory area of the portal in order to view a set of properties associated with all activated or available SIM cards. Each carrier includes a separate data set describing these properties. In an example of usage, after completing an activation/porting process, the user can utilize this resource to review SIM availability, and then commence a new activation or port based on this information. All steps associated with the activation/porting methodology are carried out via the user interfaces provided by the web-based portal. These user interfaces are shown in greater detail in the figures that follow.

Figure 3:
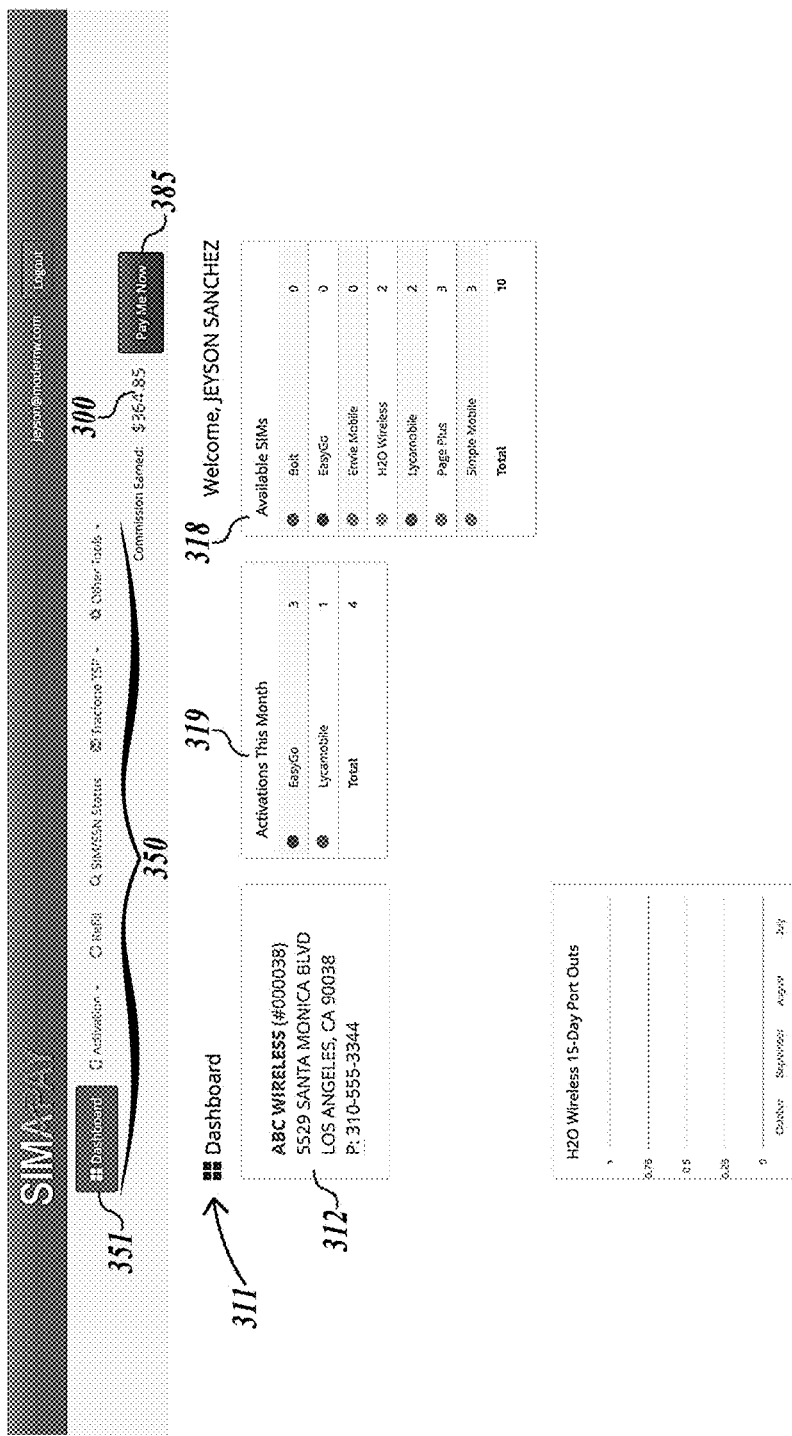
FIG. 3 illustrates an exemplary user interface of the cellphone activation portal displaying available dealer resources.

FIG. 3 illustrates an exemplary user interface of the cellphone activation portal with dashboard items that offer an overview of dealer resources. All areas of the portal include a dealer resource panel 350 with a group of primary portal links to other user interfaces. These links include, and are not limited to, DASHBOARD, ACTIVATION, REFILL, SIM/ESN STATUS, TRACPHONE TSP, and OTHER TOOLS. Regarding the current figure, the DASHBOARD link 351 is shown highlighted, as the user has clicked it, and is currently viewing the dashboard interface 311. Customer/dealer information 312 is shown on the left. An activations summary 319 shows the number of activations in the current month, by provider (e.g. EasyGo, Lycamobile, etc.). A SIMs listing 318 shows all SIMs available for activation, along with their associated providers. A commission-earned value 300 is provided to indicate to the dealer the current amount of commissions earned (e.g. $364.85). A dealer payout button 385 is provided to enable the dealer to transfer commissions earned to a bank or other account. Tabs or pull-down menus for ACTIVATION, REFILL, SIM/ESN STATUS, and OTHER TOOLS may be provided on the dashboard screen.

Figure 4:
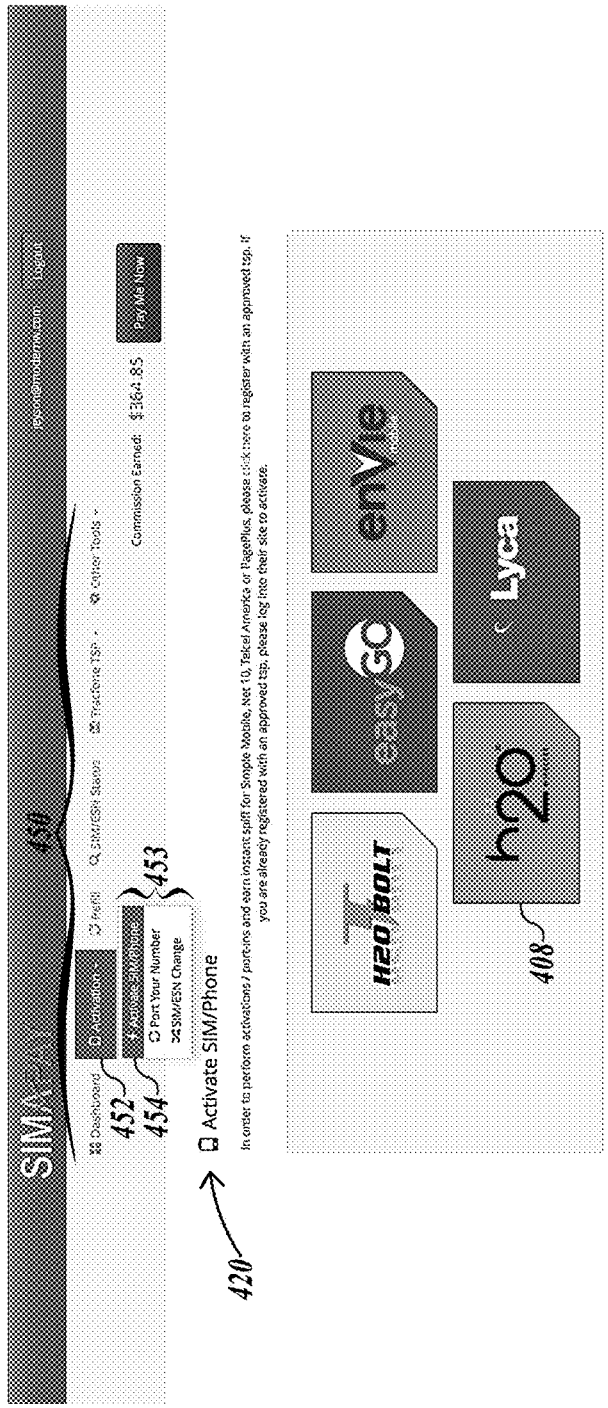
FIG. 4 illustrates an exemplary user interface of the cellphone activation portal displaying exemplary cellular service providers for SIM/phone activation.

FIG. 4 illustrates an exemplary user interface of the cellphone activation portal with a list of cellular service providers for SIM/phone activation. Selecting the ACTIVATION link 452 from the dealer resource panel 450 presents a secondary activation menu 453, from which, the user should select the ACTIVATE SIM/PHONE link 454. This takes the user to the activation interface 420. The user must select the desired cellular service provider 408 from the list to begin the activation process (see activation step 221 of FIG. 2).

Figure 5:
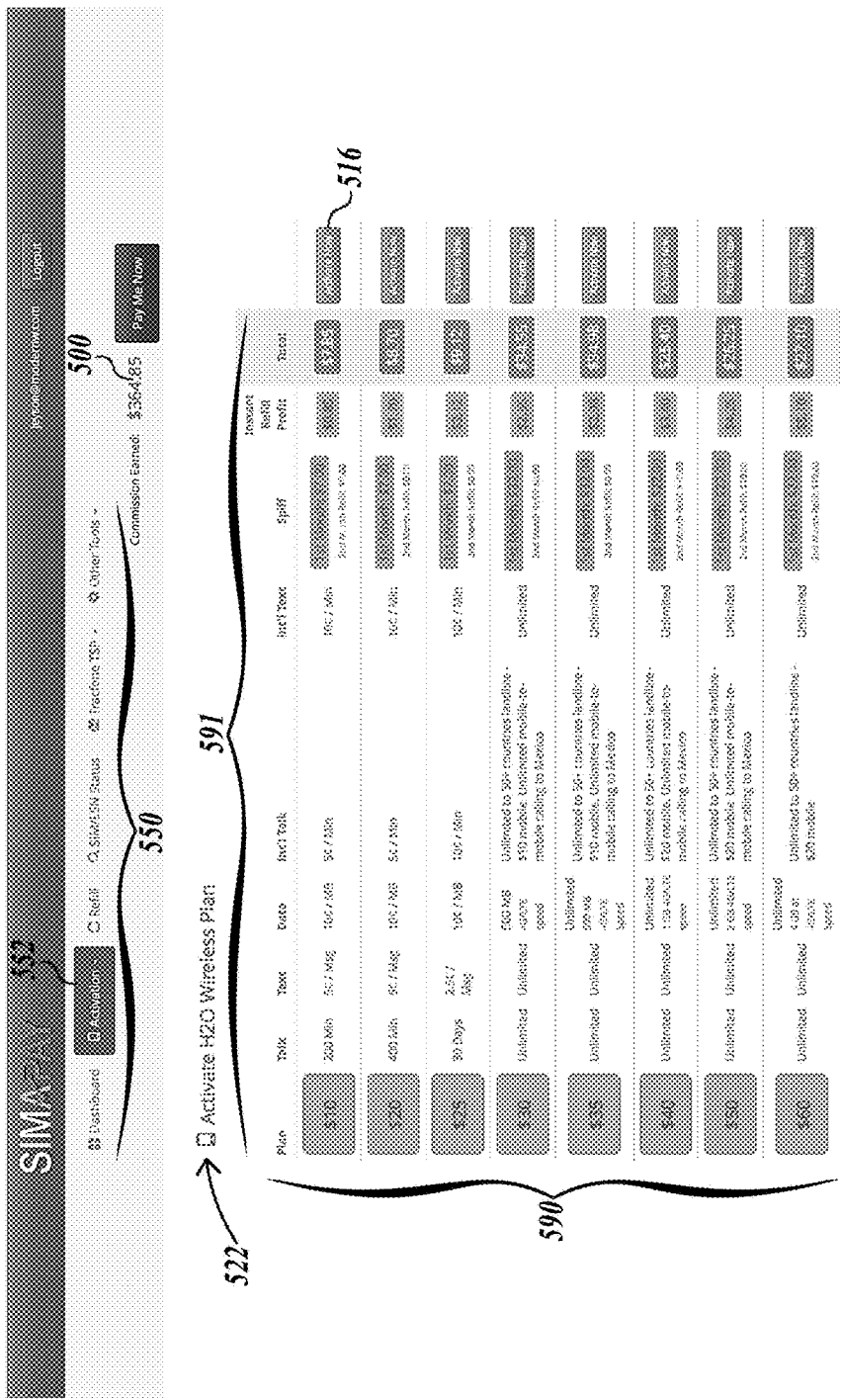
FIG. 5 illustrates an exemplary user interface of the cellphone activation portal with a list of exemplary provider plans and associated parameters for SIM/phone activation.

FIG. 5 illustrates an exemplary user interface of the cellphone activation portal with a list of provider plans and associated parameters for SIM/phone activation. An activation plan parameter interface 522 is presented to the user after a provider is chosen (see cellular service provider 408 of FIG. 4 and activation step 222 of FIG. 2). The ACTIVATION link 552 is shown highlighted in the dealer resource panel 550. The user is presented with a plurality of carrier plans 590, each with a unique set of plan parameters 591.

These parameters include plan prices, limitations on talk/text/data, if any, for each plan, and limitations on international talk time, or other parameters associated with each plan. Sales performance incentive fund (SPIFF) values associated with each plan are also listed. SPIFFs are immediate bonuses paid to dealers/distributors for a consummated sale. An instant refill profit value is displayed for each plan as well, and a total commission, including the SPIFF and instant refill profit values may be listed for each plan as well. The user selects a plan by clicking the plan activation button 516 associated with a selected plan. After selection, the commission-earned value 500 is increased by the amount of total commission associated with the selected plan.

Figure 6:
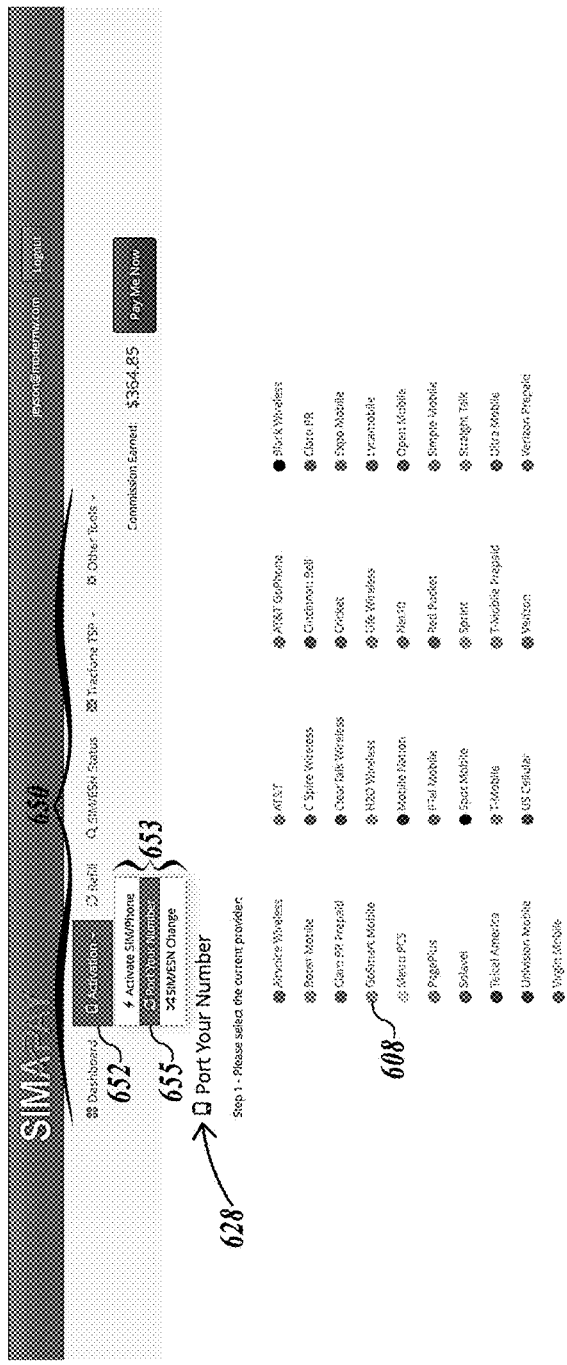
FIG. 6 illustrates an exemplary user interface of the cellphone activation portal displaying exemplary providers, whereby the customer's current provider can be selected in order to begin phone number porting.

FIG. 6 illustrates an exemplary user interface of the cellphone activation portal with a list of providers, whereby the customer's current provider can be selected in order to begin phone number porting. From the user resource panel 650, clicking the ACTIVATION link 652, then clicking the PORT YOUR NUMBER link 655 from the secondary activation menu 653 takes the user to the port-from interface 628 (see porting step 228-229 of FIG. 2). From the list of cellular service providers 608, the user is able to select a current provider from which a selected number is to be ported.

Figure 7:
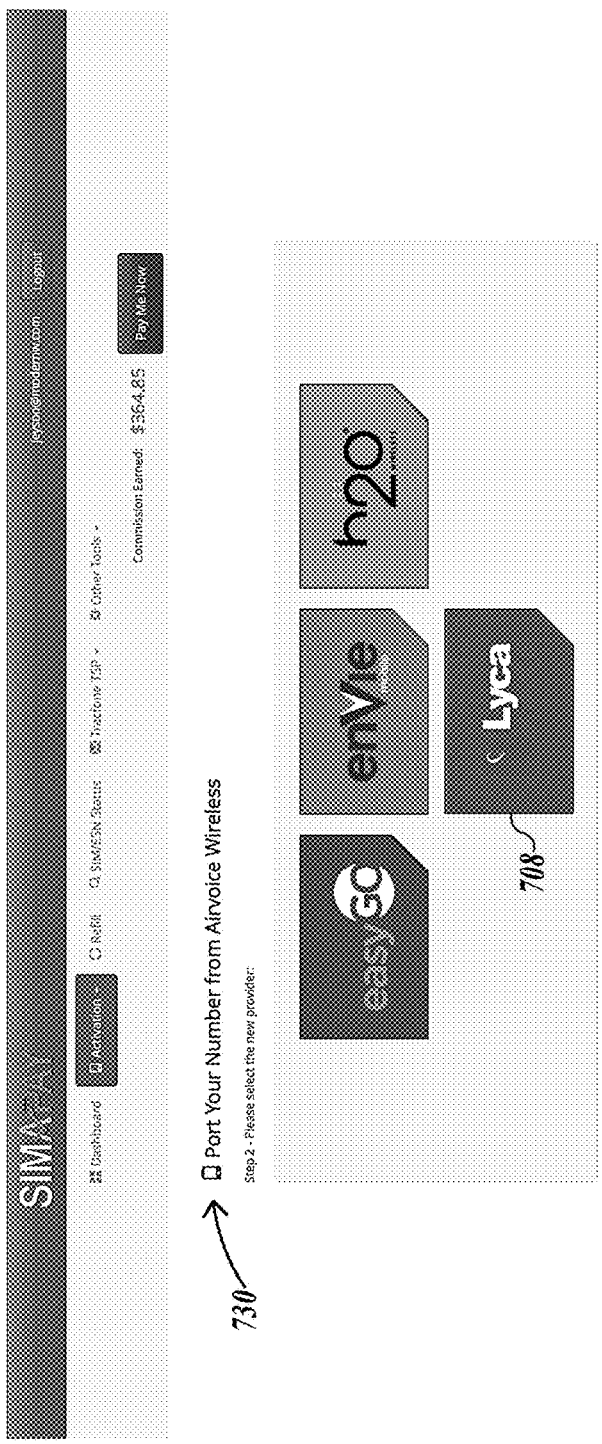
FIG. 7 illustrates an exemplary user interface of the cellphone activation portal displaying exemplary providers, whereby a new provider can be selected in order to continue phone number porting.

FIG. 7 illustrates an exemplary user interface of the cellphone activation portal with a list of providers, whereby a new provider can be selected in order to continue phone number porting. The user arrives at the port-to interface 730 by clicking the current provider in the port-from interface (see FIG. 6). Here, the user must select a new cellular service provider 708 to which the selected phone number can be ported (see porting step 230 of FIG. 2).

Figure 8:
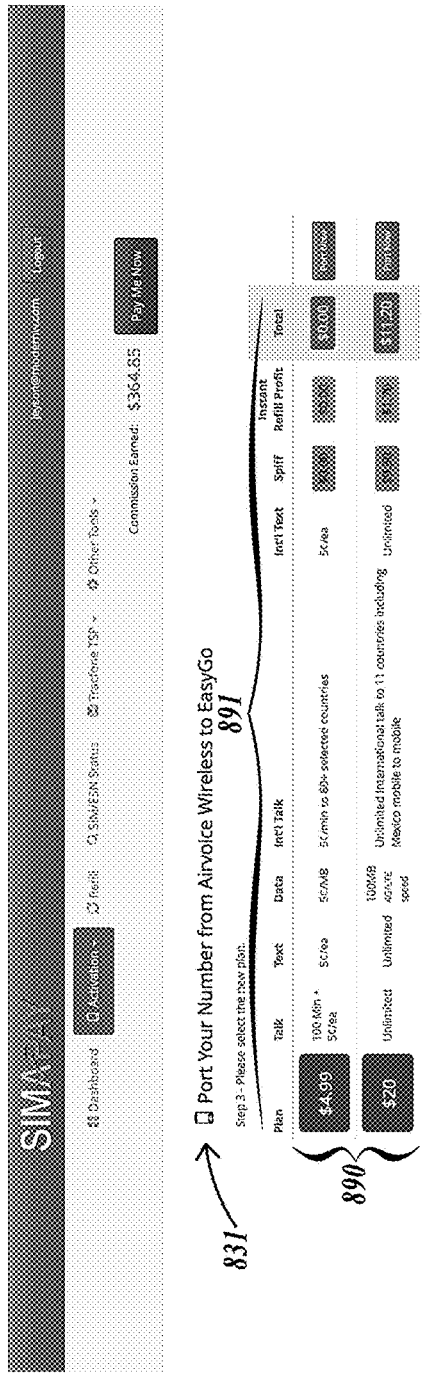
FIG. 8 illustrates an exemplary user interface of the cellphone activation portal displaying exemplary provider plans and associated parameters for phone number porting.

FIG. 8 illustrates an exemplary user interface of the cellphone activation portal with a list of provider plans and associated parameters for phone number porting. The user arrives at the porting plan parameter interface 831 by clicking a new provider in the port-to interface (see FIG. 7). Here, the user is presented with a plurality of carrier plans 890, each with a unique set of plan parameters 891. Similarly to the activation process, the plan parameters 891 present the user with pricing, talk/text/data limitations, international options, SPIFF, etc. The user must confirm their porting plan choice by clicking the appropriate button (see porting step 231 of FIG. 2).

Figure 9:
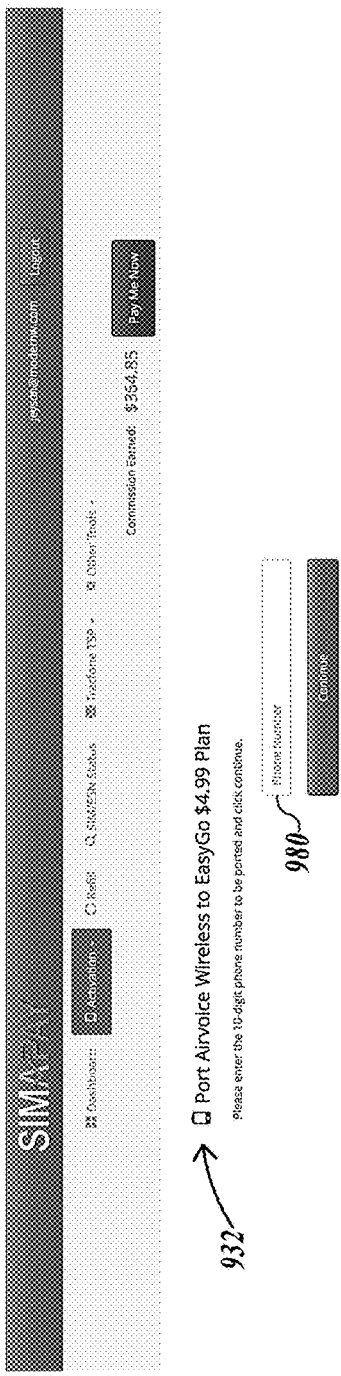
FIG. 9 illustrates an exemplary user interface of the cellphone activation portal with a data input field for dealer entry of the phone number to be ported.

FIG. 9 illustrates an exemplary user interface of the cellphone activation portal with a data input field in which to enter the phone number to be ported. The user arrives at the ported number interface 932 by clicking a plan confirmation button in the porting plan parameter interface (see FIG. 8). The ported number interface 932 provides a data input field 980 into which the user can enter the phone number that is to be ported to the selected cellular service provider (see porting step 232 of FIG. 2).

Figure 10:
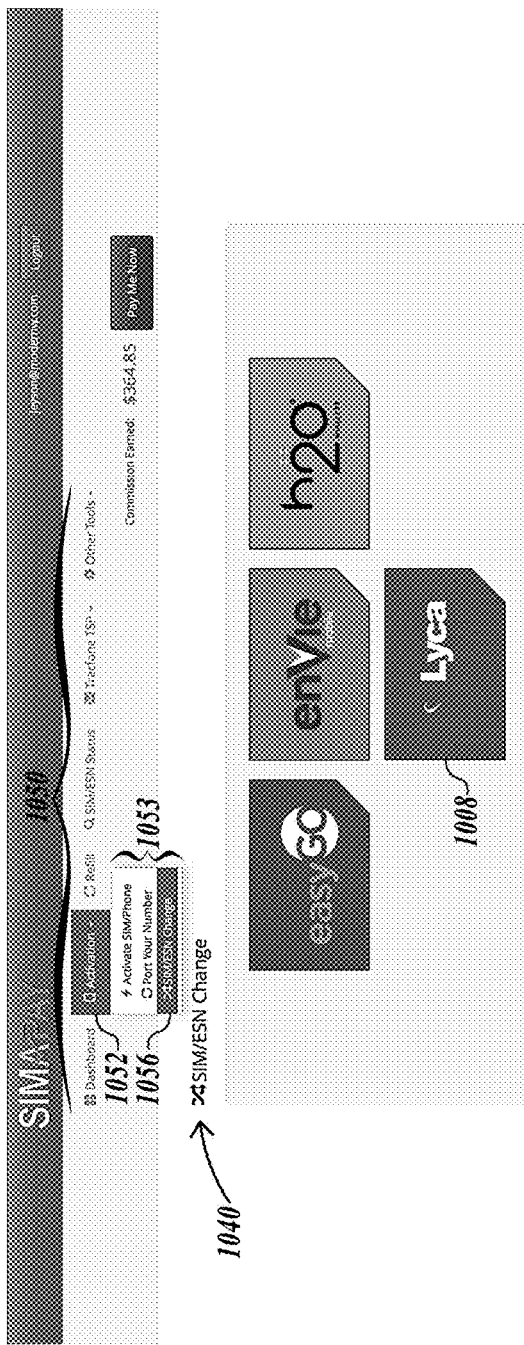
FIG. 10 illustrates an exemplary user interface of the cellphone activation portal displaying exemplary providers for SIM/ESN change.

FIG. 10 illustrates an exemplary user interface of the cellphone activation portal with a list of providers for SIM/ESN change. From the user resource panel 1050, clicking the ACTIVATION link 1052, then clicking the SIM/ESN CHANGE link 1056 from the secondary activation menu 1053 takes the user to the SIM change interface 1040. The user must choose from a list of cellular service providers 1008 in order to reassign a SIM card.

Figure 11:
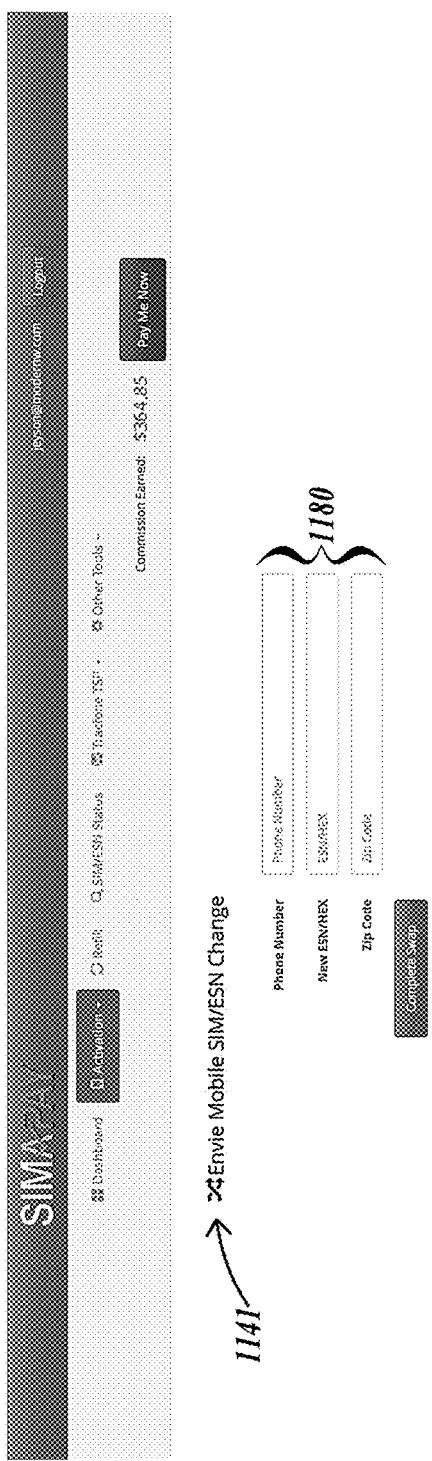
FIG. 11 illustrates an exemplary user interface of the cellphone activation portal displaying several data input fields for continuing the SIM/ESN change.

FIG. 11 illustrates an exemplary user interface of the cellphone activation portal with several data input fields for continuing the SIM/ESN change. The user arrives at the SIM swap confirmation interface 1141 by selecting a provider in the SIM change interface (see FIG. 10). Here, the user is provided with data input fields 1180 wherein reassignment information (e.g. selected number, new identification number, zip code) can be entered. The user then clicks the appropriate button to confirm the swap.

Figure 12:
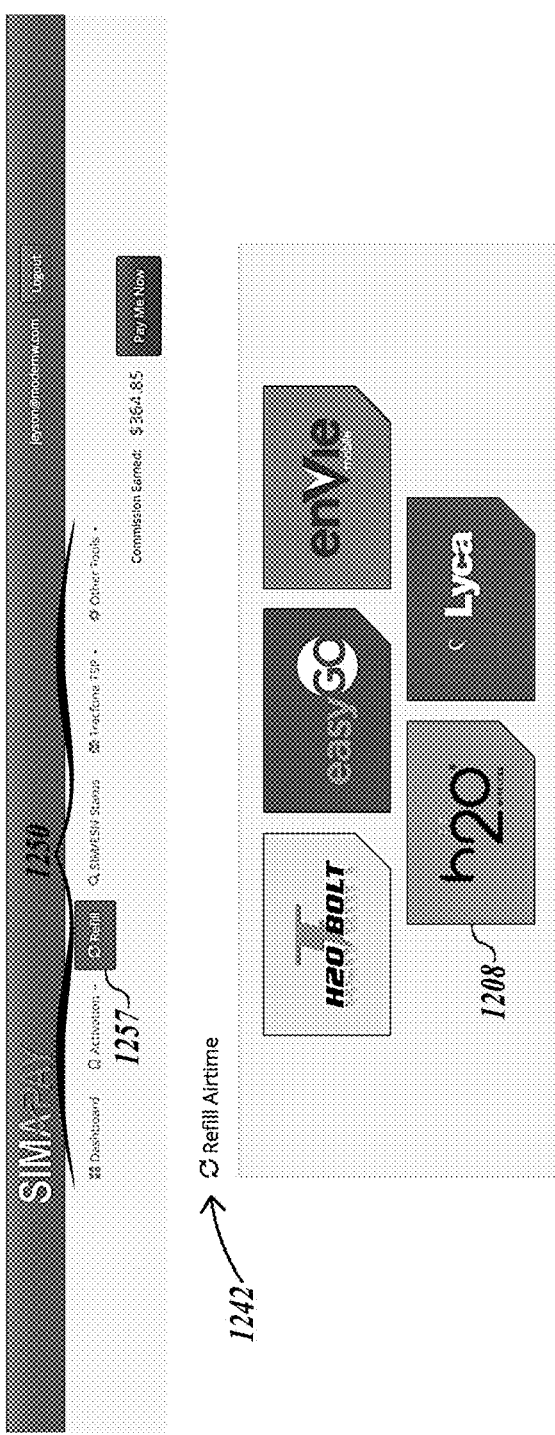
FIG. 12 illustrates an exemplary user interface of the cellphone activation portal displaying exemplary providers under which to refill airtime.

FIG. 12 illustrates an exemplary user interface of the cellphone activation portal with a list of providers under which to refill airtime. From the user resource panel 1250, clicking the REFILL link 1257 takes the user to the refill airtime interface 1242. The user must choose from a list of cellular service providers 1208 in order to continue the refill process.

Figure 13:
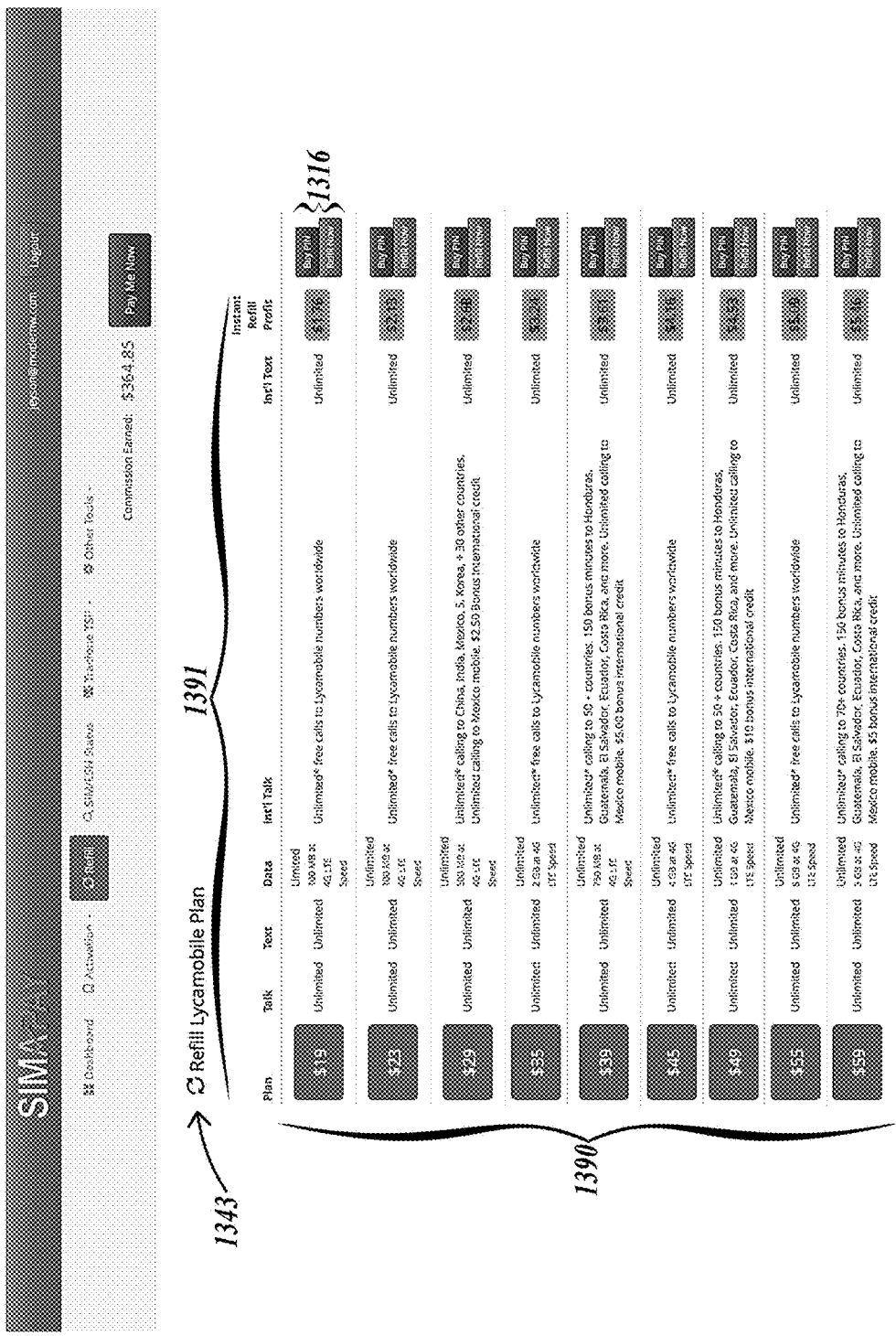
FIG. 13 illustrates an exemplary user interface of the cellphone activation portal displaying exemplary provider plans and associated parameters for refilling airtime.

FIG. 13 illustrates an exemplary user interface of the cellphone activation portal with a list of provider plans and associated parameters for refilling airtime. The user arrives at the refill parameter interface 1343 by clicking on a provider in the refill airtime interface (see FIG. 12). As in the previously mentioned activation/porting scenarios, a plurality of carrier plans 1390 is offered, each with the set of plan parameters 1391. One or more plan activation buttons 1316 may be present per plan, e.g. BUY PIN or REFILL AIRTIME, as shown. The user must click one of these buttons 1316 in order to continue the refill process.

Figure 14:
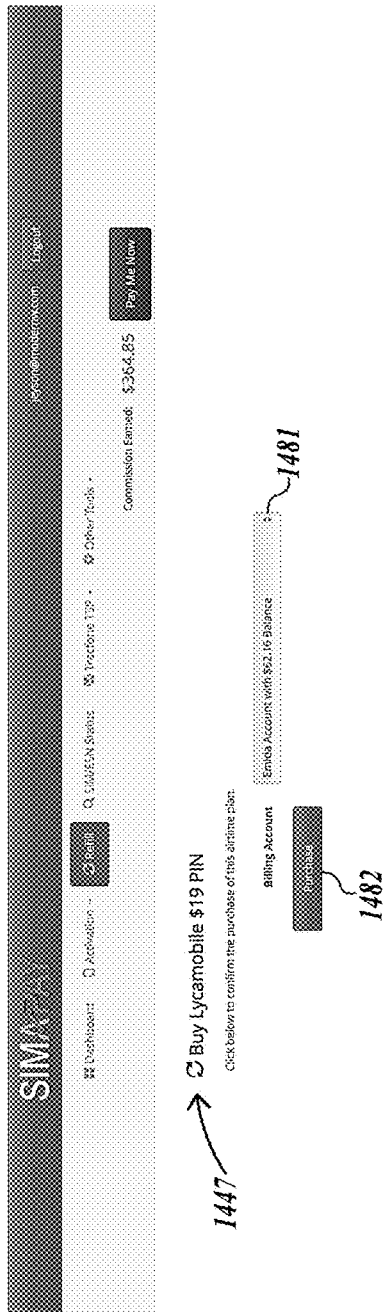
FIG. 14 illustrates an exemplary user interface of the cellphone activation portal with an option selection menu for continuing the purchase of a PIN for refilling airtime.

FIG. 14 illustrates an exemplary user interface of the cellphone activation portal with an option selection menu for continuing the purchase of a PIN for refilling airtime. The user arrives at the PIN-purchasing interface 1447 by clicking the BUY PIN button on the refill parameter interface (see plan activation buttons 1316 of FIG. 13). An option selection menu 1481 is provided with one or more dealer financing accounts to choose from. The user must select one then click the page confirmation button 1482 to confirm.

Figure 15:
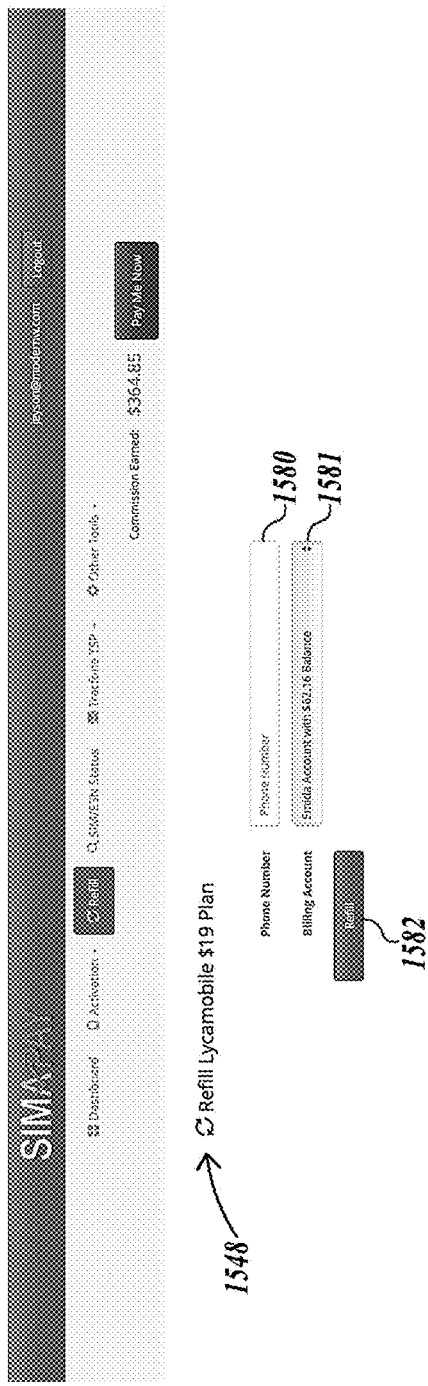
FIG. 15 illustrates an exemplary user interface of the cellphone activation portal with a data input field and option selection menu for completing the airtime refilling purchase.

FIG. 15 illustrates an exemplary user interface of the cellphone activation portal with a data input field and option selection menu for completing the airtime refilling purchase. The user arrives at the instant refill interface 1548 by clicking the REFILL NOW button on the refill parameter interface (see plan activation buttons 1316 of FIG. 13). A data input field 1580 is provided for the associated phone number, and an option selection menu 1581 is provided with one or more dealer financing accounts to choose from. The user must complete these fields then click the page confirmation button 1582 to confirm.

Figure 16:
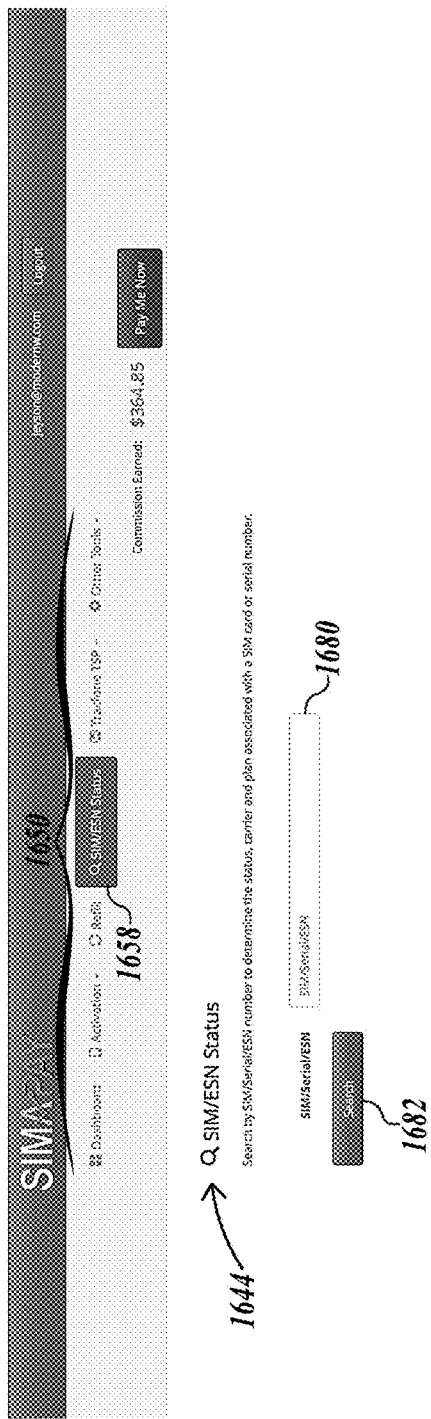
FIG. 16 illustrates an exemplary user interface of the cellphone activation portal with data input field for entering a SIM/Serial/ESN number in order to check status.

FIG. 16 illustrates an exemplary user interface of the cellphone activation portal with data input field for entering a SIM/Serial/ESN number in order to check its status. From the user resource panel 1650, clicking the SIM/ESN STATUS link 1658 takes the user to the check status interface 1644. A data input field 1680 is provided wherein the user can type the selected SIM/SERIAL/ESN number in order to check its status. The user must click the page confirmation button 1682 to yield a search. This will provide an associated status, plan, and other information associated with the input identification number.

Figure 17:
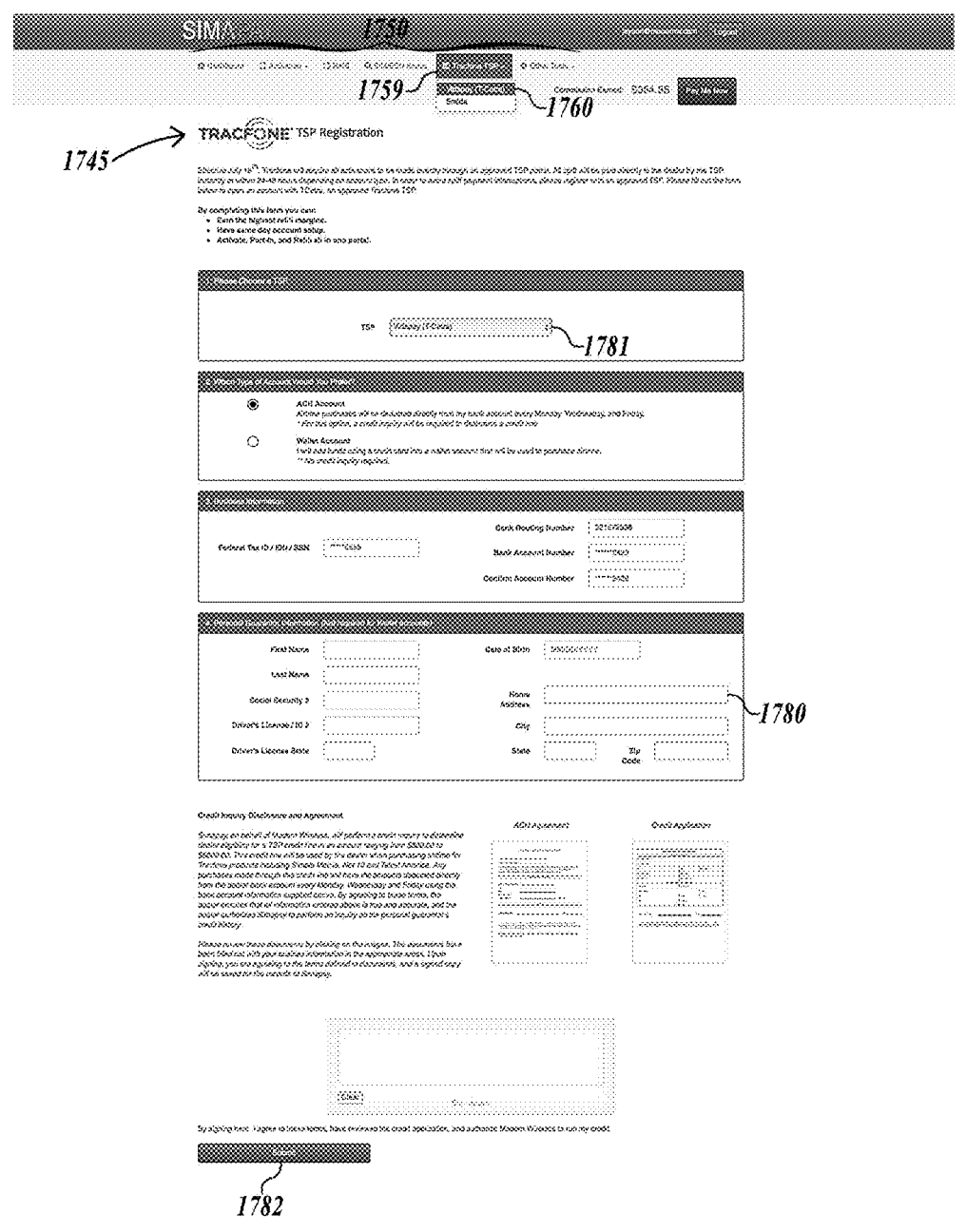

FIG. 17 illustrates an exemplary user interface of the cellphone activation portal with dealer payment account options. From the user resource panel 1750, clicking the TRACFONE TSP link 1759, then clicking the VIDAPAY (T-CETRA) link 1760 from the secondary menu takes the user to the payment account interface 1745. Various option selection menus 1781 and data input fields 1780 are available on this page in order to fully register for a selected payment account type. One or more account types may be available. The user must complete these fields then click the page confirmation button 1782 to confirm.

Figure 18:
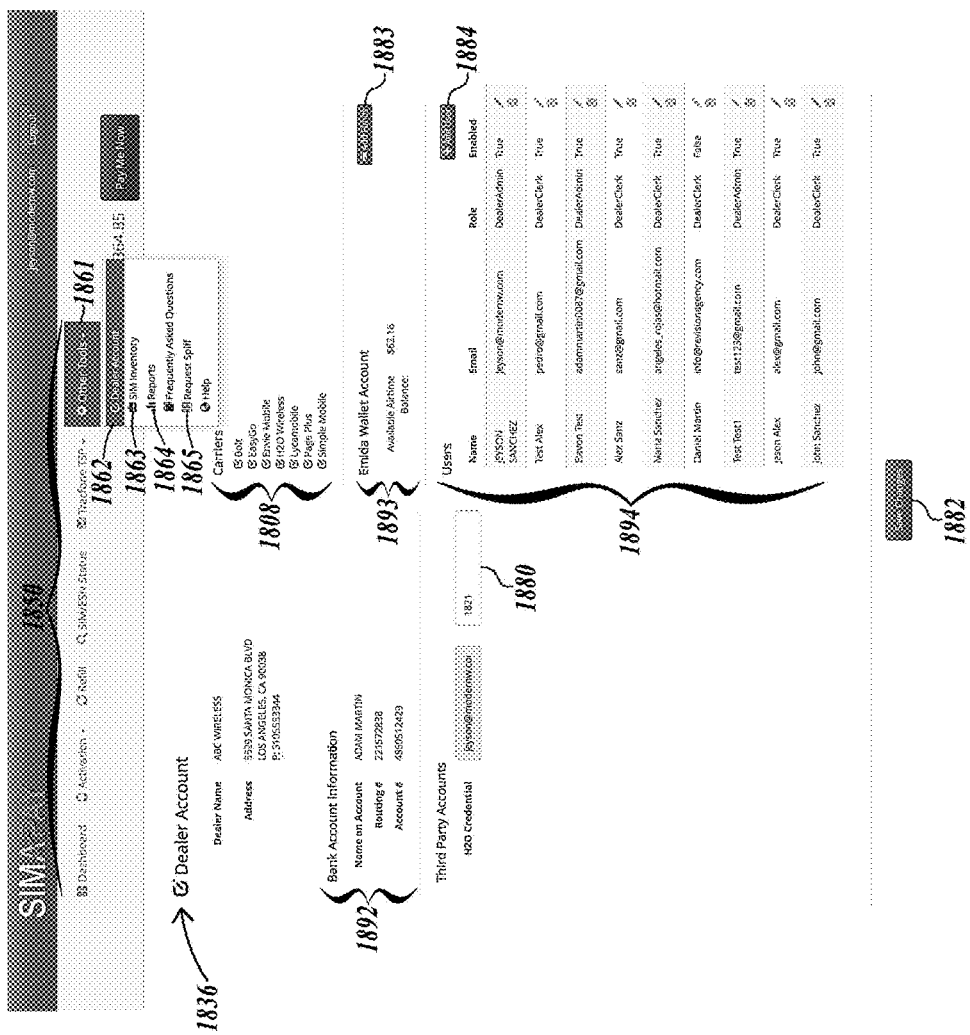
FIG. 18 illustrates an exemplary user interface of the cellphone activation portal with detailed dealer account information and settings.

FIG. 18 illustrates an exemplary user interface of the cellphone activation portal with detailed dealer account information and settings. From the user resource panel 1850, clicking the OTHER TOOLS link 1861, then clicking the DEALER ACCOUNT link 1862 from the secondary menu takes the user to the dealer account interface 1836 (see dealer account 136 of FIG. 1). The secondary menu may also provide such links as SIM inventory 1863, REPORTS 1864, REQUEST SPIFF 1865, FREQUENTLY ASKED QUESTIONS, HELP, etc. Various information fields may be provided on the dealer account interface 1836, including a dealer bank account area 1892, a carrier list 1808, dealer payment account area 1893, a user/dealer list 1894, etc. The dealer payment account area 1893 may further comprise an ADD FUNDS button 1883. An ADD USER button 1884 may accompany the user/dealer list 1894. One or more data input fields 1880 may be present on this interface in order to modify certain user account settings. The user must click the page confirmation button 1882 in order to save any changes.

Figure 19:
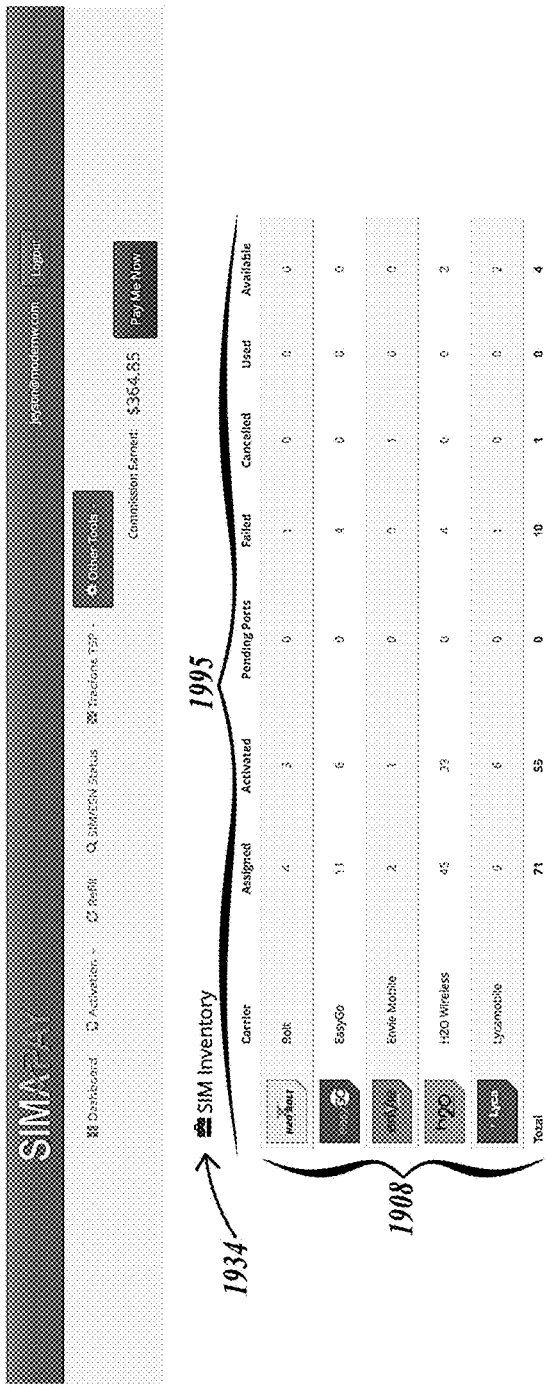
FIG. 19 illustrates an exemplary user interface of the cellphone activation portal with an inventory of SIMs and associated properties per cellular service provider.

FIG. 19 illustrates an exemplary user interface of the cellphone activation portal with an inventory of SIMs and associated properties per cellular service provider. From the user resource panel, clicking the OTHER TOOLS link, then clicking the SIM INVENTORY link (see FIG. 18) from the secondary menu takes the user to the SIM inventory interface 1934 (see SIM inventory 134 of FIG. 1). This area of the portal comprises a list of providers 1908, each with SIM properties 1995 that include a number of previously activated SIMs. These properties show the status of the SIMs, including the number of SIMs assigned to each provider/carrier, the number of activated SIMs, any pending ports of numbers, failures, cancellations and the number available.

Figure 20:
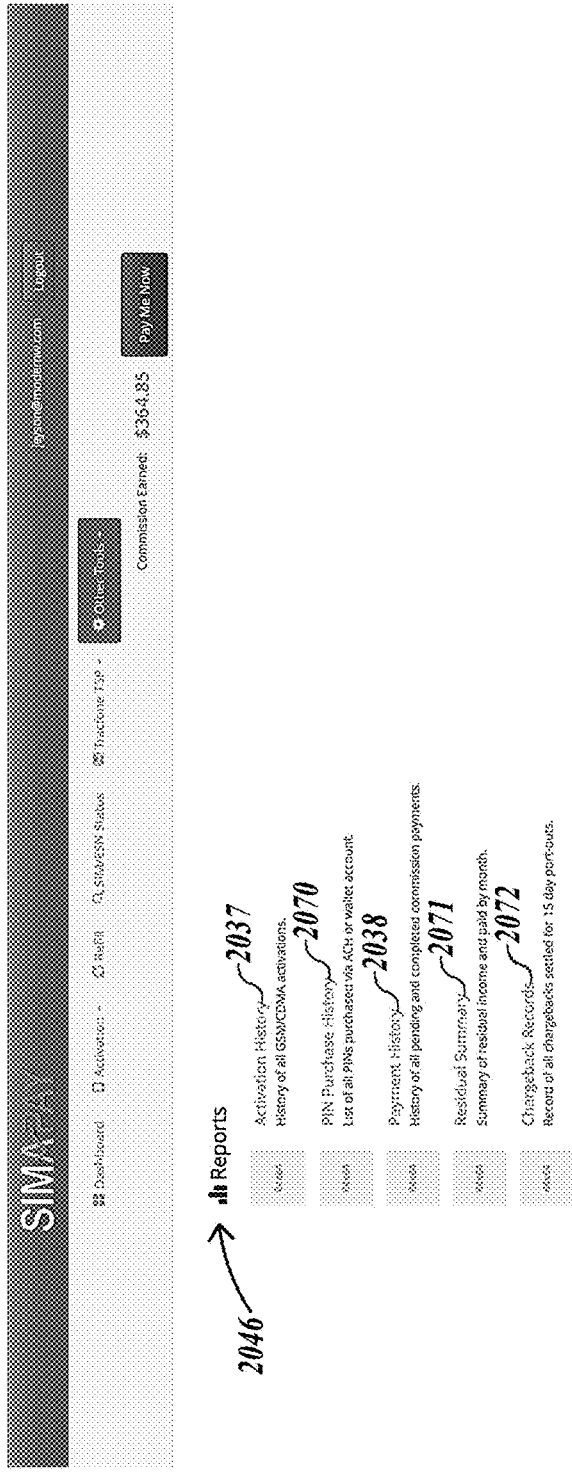
FIG. 20 illustrates an exemplary user interface of the cellphone activation portal with a list of portal resource reports.

FIG. 20 illustrates an exemplary user interface of the cellphone activation portal with a list of portal resource reports. From the user resource panel, clicking the OTHER TOOLS link, then clicking the REPORTS link (see FIG. 18) from the secondary menu takes the user to the reports interface 2046. The user can view detailed reports for portal resources including, but not limited to, activation history 2037, PIN purchase history 2070, payment history 2038, residual summary 2071, and chargeback records 2072. Selecting each report link takes the user to the associated interface.

Figure 21:
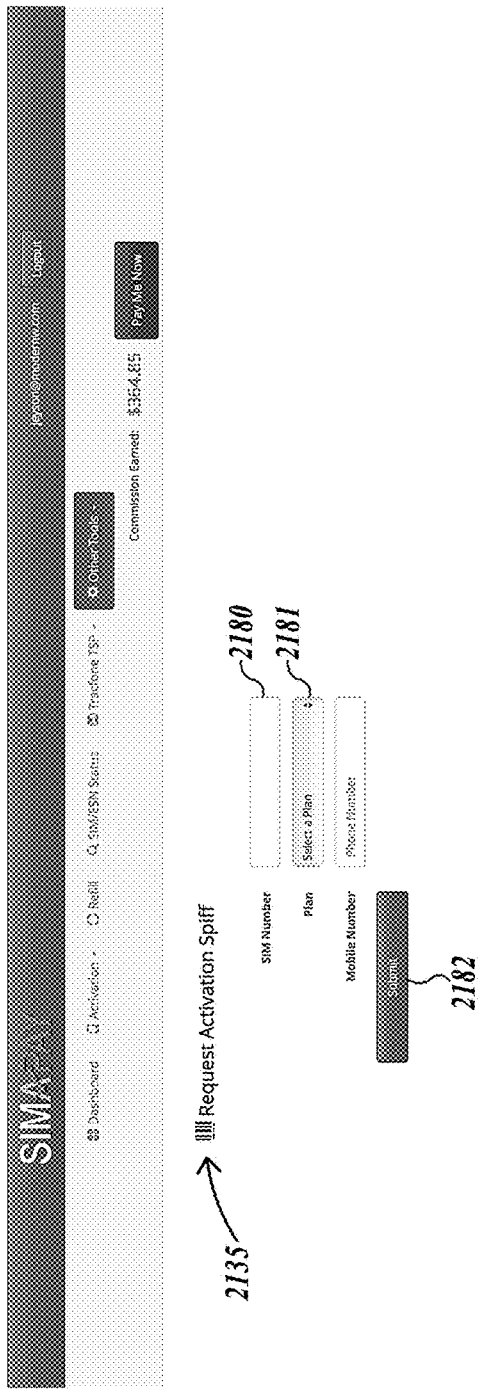
FIG. 21 illustrates an exemplary user interface of the cellphone activation portal with data input fields and an option selection menu for requesting an activation SPIFF.

FIG. 21 illustrates an exemplary user interface of the cellphone activation portal with data input fields and an option selection menu for requesting an activation SPIFF. From the user resource panel, clicking the OTHER TOOLS link, then clicking the REQUEST SPIFF link (see FIG. 18) from the secondary menu takes the user to the SPIFF interface 2135. There are data input fields 2180 wherein a SIM number and cellular phone number can be entered, along with an option selection menu 2181 with associated plans to choose from. The user must click the page confirmation button 2182 in order to submit this information. This action yields an immediate bonus for the associated user/dealer from the consummated sale.

Figure 22:
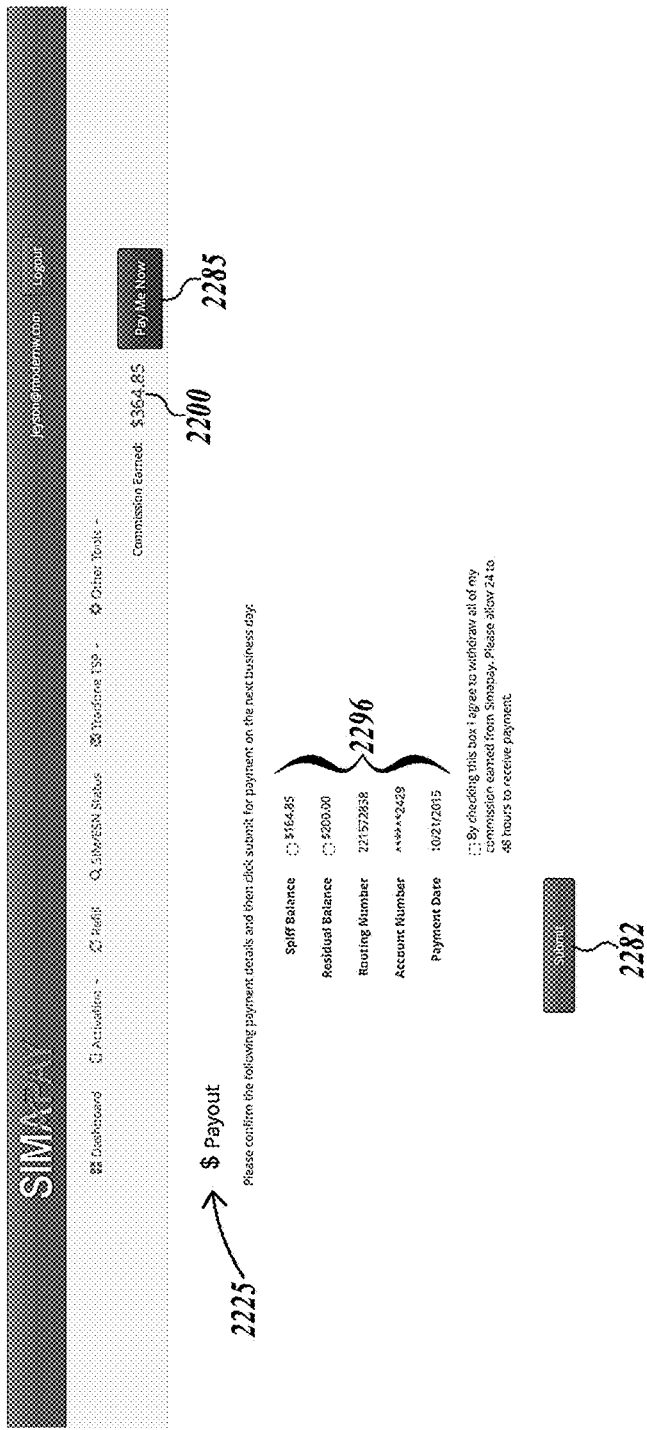
FIG. 22 illustrates an exemplary user interface of the cellphone activation portal with dealer payout details and confirmation.

FIG. 22 illustrates an exemplary user interface of the cellphone activation portal with dealer payout details and confirmation. The user/dealer can navigate to the payout interface 2225 by clicking the ubiquitous dealer payout button 2285, which can be found in any area of the portal and is highly visible—most likely at or near the top of the user interface. A commission-earned indicator 2200 is provided near the payout button 2285 to indicate the current amount of commissions earned. A payout properties list 2296 is the predominant feature of the payout interface 2225. Clicking the page confirmation button 2282 allows the user to submit the payout request. The user/dealer can transfer commissions earned to a bank or other dealer account (see FIG. 17).

While there have been described herein what are considered to be preferred and exemplary embodiments of the present invention, other modifications of the invention shall be apparent to those skilled in the art from the teachings herein. It is therefore desired to be secured, in the appended claims all such modifications as fall within the spirit and scope of the invention.

What is claimed is:

1. A web-based portal for management of wireless communication services comprising:
    a first database configured to store user account information that can be accessed by the user upon logging into the web-based portal;
    a second database configured to receive service provider data from a plurality of service providers and communicate the service provider data to one or more user interfaces, wherein the service provider data includes the name of the service provider, the details of the cellular service plan, and user commission data;
    a user interface for activating a cellular device or SIM card, the user interface displaying commissions associated with each cellular service plan, wherein the user interface is in communication with the first database and second database;
    a user interface for porting a cellular device or SIM card, the user interface displaying commissions associated with each cellular service plan, wherein the user interface is in communication with the first database and second database;
    a user interface for selecting a cellular service provider, wherein the user interface is in communication with the first database and second database;
    a user interface for disbursing a user commission, wherein the user interface is in communication with the first database; and
    further comprising a user interface for displaying user account summary information associated with the user account, the user account summary information including the user location, user contact information, summary of device activations, and a summary of available SIMs organized by service provider, wherein the user interface is in communication with the first database.

2. The web-based portal of claim 1 further comprising a user interface for displaying real-time SIM inventory associated with the user account, wherein the user interface is in communication with the first database.

3. The web-based portal of claim 1 further comprising a user interface for displaying real-time activation history associated with the user account, wherein the user interface is in communication with the first database.

4. The web-based portal of claim 1 further comprising a user interface for displaying real-time payment history associated with the user account, wherein the user interface is in communication with the first database.

5. The web-based portal of claim 1 further comprising a user interface for refilling airtime or data associated with a cellular service plan.

6. A computer implemented method for activating a cellular device through a web-based portal comprising:
    providing access to a registered user account database, the database configured to store user account information;
    receiving cellular service provider data from a plurality of cellular service providers;
    combining and storing the cellular service provider data in a database;
    displaying a plurality of cellular service providers for user selection based on the cellular service provider data;

receiving a user selected cellular service provider;

displaying cellular service plan options associated with a selected cellular service provider based on the cellular service provider data;

receiving a user selected cellular service plan to be activated;

displaying commission data associated with a selected cellular plan to be activated, the commission data including the Sales performance incentive fund (SPIFF), instant refill profit, and total commission;

providing for the activation of the selected cellular service plan;

updating the user's account in real-time to reflect the activation, including updating a user activation history, updating a SIM inventory, and updating a total commission earned value; and disbursing user commissions in response to a user request.

7. The computer implemented method of claim 6 further comprising displaying real-time SIM inventory data that reflects the activated cellular service plan.

8. The computer implemented method of claim 6 further comprising displaying real-time activation history associated with the user account that reflects the activated cellular service plan.

9. The computer implemented method of claim 6 further comprising displaying real-time payment history associated with the user account that reflects the activated cellular service plan.

10. The computer implemented method of claim 6 further comprising refilling airtime or data associated with a cellular service plan.

11. A computer implemented method for porting a cellular device through a web-based portal comprising:

providing access to a registered user account database, the database configured to store user account information;

receiving cellular service provider data from a plurality of cellular service providers;

combining and storing the cellular service provider data in a database;

displaying a plurality of cellular service providers for user selection based on the cellular service provider data;

receiving a port number entered by a user through a user interface;

receiving a user selected prior cellular service provider for the cellular device;

displaying cellular service plans associated with a selected cellular service provider based on the cellular service provider data;

receiving a user selected cellular service plan;

displaying commission data associated with a selected cellular plan to be activated, the commission data including the SPIFF, instant refill profit, and total commission;

providing for the porting of the selected cellular plan;

updating the user's account in real-time to reflect the total commission earned for the activation;

receiving a user phone number entered by a user;

receiving a prior provider account information and a new provider SIM; and disbursing user commissions in response to a user request.

12. The computer implemented method of claim 11 further comprising displaying real-time SIM inventory data that reflects the ported cellular service plan.

13. The computer implemented method of claim 11 further comprising displaying real-time payment history associated with the user account that reflects the ported cellular service plan.

* * * * *